March 14, 1939.  A. OLIER  2,150,608
EXTRACTION COLUMN
Filed Nov. 12, 1937  2 Sheets-Sheet 1
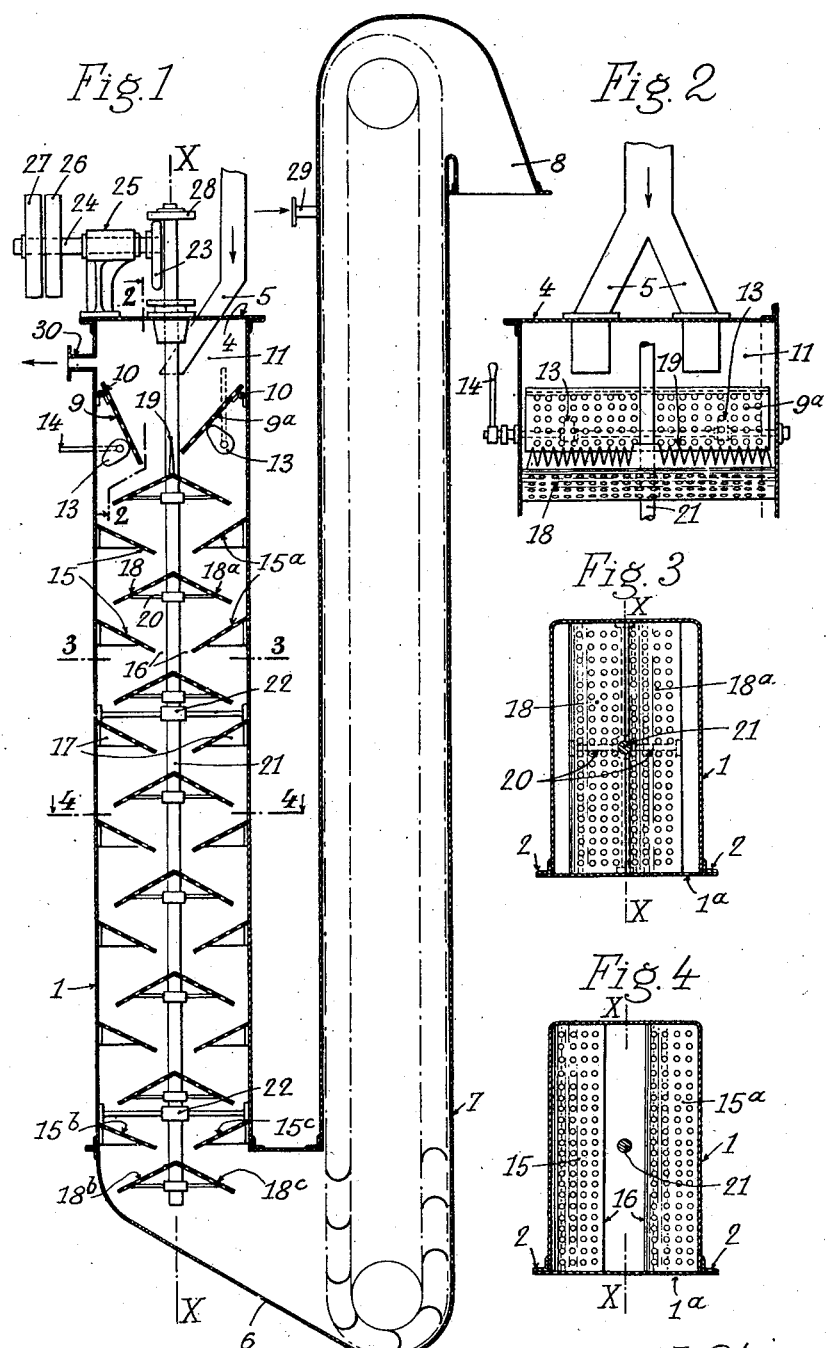

Patented Mar. 14, 1939

2,150,608

UNITED STATES PATENT OFFICE 2,150,608

EXTRACTION COLUMN

André Olier, Clermont-Ferrand, France, assignor to Societe Anonyme des Etablissements A. Olier, Clermont-Ferrand, France Application November 12, 1937, Serial No. 174,260
In France November 18, 1936

6 Claims. (Cl. 87—6)

The present invention has for its object a reaction column, which also provides, in particular, for the continuous extraction by one or more solvents or reagents, of one or more substances which are contained in solution or combination in solid bodies or material, such as oleaginous material (ground seeds and oil-cake) in the case of the oil industry.

The said column is chiefly characterized by the fact it comprises, disposed one below the other and separated by a suitable space, planes or surfaces which are perforated and have the inclined position, and whose lines of greatest slope are all situated in the same plane and are arranged in zigzag, so that the material under treatment will move on a zigzag path and in thin sheets along the said planes or surfaces, whilst the solvent or solvents, or other liquid or gaseous fluids used for the treatment will traverse the said planes or surfaces in the contrary direction to that of the material, and pass through their perforations.

According to the density of the material to be exhausted, the direction of such material may be either upward or downward, while the solvent or solvents will always move in a contrary direction to the material.

In a preferred embodiment, there are employed, side by side, two sets or perforated surfaces which are mounted in zigzag in each set, the adjacent surfaces of the two sets being preferably inclined in contrary directions.

According to another characteristic, in the single set or in each set of perforated surfaces mounted in zigzag, the surfaces inclined in contrary directions have a relative alternate movement of translation, parallel with the axis of the column, the surfaces inclined in one direction being for example stationary, while the surfaces inclined in the other direction are vertically movable.

Thus in the above-mentioned embodiment comprising two sets of perforated surfaces, the adjacent surfaces of the two sets may be vertically movable and may be mounted, for instance, upon a shaft which is given an alternate vertical movement, whilst the other surfaces are fixed and are mounted on the walls of the column.

Further characteristics will be set forth in the following description.

In the accompanying drawings, which are given solely by way of example:

Fig. 1 is a vertical lengthwise section of an extraction column which is improved according to the invention and provides for the downward circulation of the material to be exhausted, which has a greater density than the solvent or solvents. The said figure also shows an elevator arranged at the outlet of the column for the purpose of taking up the exhausted material.

Fig. 2 is a partial vertical section on the line 2—2 of Fig. 1.

Figure 5:
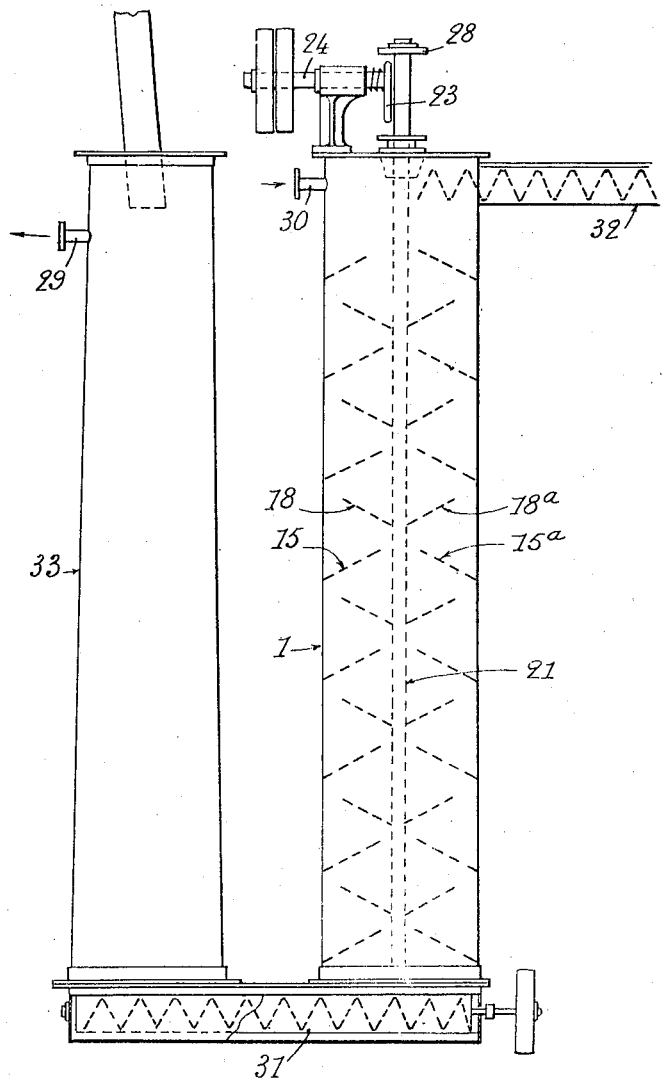

Figs. 3 and 4 are horizontal sections on the lines 3—3 and 4—4 of Fig. 1.

Fig. 5 is diagrammatic view of a column adapted for material which is lighter than the solvent or solvents, this material circulating in the column in the upward direction.

In the embodiment represented in Figs. 1 to 4, the extraction column comprises a vertical receptacle 1 consisting of metal or other material. The said receptacle, which is represented as having a single wall, may obviously have a double wall. The cross-section of the said receptacle may be as desired, but it is preferably of a square or rectangular form as shown (Figs. 3 and 4). The receptacle may be formed, for instance, by the longitudinal bending, in U-shape, of a sheet-metal piece (or a double wall) which thus forms three sides, the fourth side 1ª (Figs. 3 and 4) being removable and secured for instance to angle-iron members 2 mounted on the edges of the two adjacent faces.

The said receptacle 1 is closed at the top by a cover 4 (Figs. 1 and 2), traversed by one or more conduits 5 which are connected with a feeding chute, not shown, and serve for the supply of the material under treatment to the upper part of said receptacle 1 and practically in its vertical longitudinal plane of symmetry X—X.

The lower part of the receptacle 1 is joined by a connecting part 6 to a bucket elevator 7 at whose upper end is a discharge conduit 8 which opens downwardly.

On the inner faces of the receptacle 1, and parallel with the plane X—X, are located at a certain distance from the cover 4, two perforated plates 9 and 9ª which are pivotally mounted on the said faces by means of hinges 10. The plates 9, 9ª, which form above them a chamber 11 termed "maceration chamber", may be more or less inclined by any suitable means, for instance by means of oscillating cams 13 rotated by levers 14 arranged outside of the receptacle 1.

Below the said pivoted plates 9, 9ª, the same faces of the receptacle 1 are provided, at stated distances, with perforated plates 15, 15ª (Figs. 1 and 4), which are downwardly inclined from the wall of the receptacle 1 towards the middle plane X—X, but without reaching this plane, thus providing, for each pair, between their adjacent central edges, a middle opening 16 (Figs. 1 and 4).

The said plates 15, 15ª, which are removable or not, are mounted on the walls of the said receptacle, by any suitable means, in a fixed inclined position, for instance by the use of angle-irons 17 or like members.

Between the stationary plates 15, 15ª are respectively mounted additional perforated plates 18, 18ª (Figs. 1, 2, 3) which are inclined in the contrary direction to the corresponding plates 15, 15ª, the lines of greatest slope of all such plates being situated in a vertical plane which is perpendicular to the plane X—X. The plates 18 and 18ª form by pairs roof-shaped devices, whose upper ridges are situated in the plane X—X. The ridge of the first roof section located at the top, carries a comb 19 with vertical teeth.

All of the plates 18, 18ª which stop at a certain distance from the inner faces of the receptacle 1 are secured by brackets 20 to a vertical shaft 21 of circular, square or any polygonal section. The said shaft 21 is mounted in bearings 22 (Fig. 1) which are secured, at stated distances apart, to the walls of the receptacle 1, and is vertically slidable along its longitudinal axis, in the said bearings. The said shaft is given a vertical reciprocating movement whose amplitude is such that the plates 18, 18ª which move with the same, will not make contact with the plates 15, 15ª between which they are located. The reciprocating motion of the shaft 21 may be obtained by any suitable means, and for instance, as shown in Fig. 1 by the use of an eccentric cam 23, which is keyed to a horizontal shaft 24 which rotates in a bearing 25 mounted on the cover 4, and carries a loose pulley 26 and a driving pulley 27. The cam 23 acts upon the lower face of a disc 28 which is mounted on the upper end of the shaft 21. The said cam has such outline and angular setting that it will rapidly lift the shaft 21, but will only allow it to descend very slowly by gravity.

The elevator 7 is provided at the upper part with an inlet pipe 29 for the supply of the solvent or solvents, and the receptacle 1 is provided, below the cover 4, in the maceration chamber 11, with a neck 30 for the discharge of the solvent or solvents loaded with the substance or substances to be extracted.

The material to be treated is delivered by the conduit or conduits 5 to the upper part of the receptacle 1, i. e. into the maceration chamber 11.

It is discharged by gravity through the central adjustable opening formed between the lower edges of the two plates 9, 9ª. In this opening, it is divided into two parts by the vertical comb 19. One of these parts slides down by gravity on a zigzag path, successively upon the set of plates 15—18 which are alternately inclined in contrary directions; the other part descends in a similar manner upon the second set of plates 15ª—18ª which are also alternately inclined in contrary directions. The descent of the material is facilitated by the reciprocating vertical movements imparted to the plates 18—18ª carried by the shaft 21, by the action of the rotating cam 23, the upward movements being very rapid and the downward movements very slow.

The exhausted material is directed by the inclined conduit 6 into the bottom of the elevator 7 which discharges it through the upper opening 8, from which it is brought, for instance, to a drying device, not shown, in order to remove the solvent or solvents with which it is saturated.

As concerns the said solvent or solvents, these are supplied to the apparatus through the neck 29 of the elevator 7, and are discharged through the maceration chamber 11 and the neck 30 after circulating in the upward direction in the whole of the receptacle 1, thus passing through the various perforated plates 15—15ª and 18—18ª. Said solvent or solvents will thus circulate in counter-current with reference to the material, and they traverse the thin sheets of moving material. As concerns these sheets, a certain number are spread upon the various perforated plates 15, 15ª and 18, 18ª; the others have the vertical position, and form, as it were, curtains of material which drop respectively from the lower edges of the plates 15, 15ª and 18, 18ª upon the upper parts of the plates 18, 18ª and 15, 15ª.

It should be noted that the last two perforated plates 18ᵇ, 18ᶜ which are mounted on the lower end of the shaft 21 may be located at a distance from the lower edges of the last two stationary perforated plates 15ᵇ, 15ᶜ, which is less than the distance between the other sets of fixed and movable plates. In consequence, a given upward movement of the shaft 21 which exceeds the normal movement but will not allow the contact between all of the other sets of plates, will provide for the closing of the space between the two fixed plates 15ᵇ, 15ᶜ by means of the two lower movable plates 18ᵇ, 18ᶜ which now serve as a check-valve, thus cutting off the material in case the elevator 7 should stop its action.

A like result may be obtained by pivotally mounting the two lower panels 15ᵇ and 15ᶜ so that their lower central edges may be brought in contact.

In the embodiment above described, it is supposed that the material under treatment has an absolute density which exceeds the density of the solvent or solvents.

In the contrary case, the operation will be modified, as well as the extracting apparatus, as shown in Fig. 5, and herein the fixed plates 15, 15ª and the movable plates 18, 18ª which are mounted on the shaft 21, are inclined in contrary directions to the corresponding plates shown in the preceding embodiment. The solvent is supplied through the neck 30, which served as the exit of the mixture in the preceding case, and the material is delivered by pressure to the lower part of the column by a screw conveyor 31, or the like, which receives the material from a column 33 which now serves as the maceration column. The discharge of the solvent mixture and of the extracted product or products will take place through the neck 29. The exhausted material is removed for instance by a screw conveyor 32, and may be brought to a drying apparatus, as in the preceding case.

Obviously, the said invention is not limited to the embodiments herein described and represented, which are given solely by way of example.

Thus the movable plates 18, 18ª may, if necessary, be mounted upon several vertical shafts 21 whose axes would be situated in the plane X—X, and all of these shafts would be vertically movable in synchronism, for instance by cams similar to each other and having the same angular position, or by a rigid connection between the said shafts.

Having now described my invention what I claim as new and desire to secure by Letters Patent is:

1. An extraction column comprising a casing, two sets of inclined, perforated surfaces arranged in zigzag above each other at a suitable distance from each other, means for delivering at one end of the casing the material to be treated, means for delivering the extracting medium at the opposite end of the casing and means for imparting an axial reciprocating motion to one set of perforated surfaces.

2. An extraction column comprising a casing, two sets of inclined, perforated surfaces arranged in zigzag above each other at a suitable distance from each other, means for delivering at one end of the casing the material to be treated, means for delivering the extracting medium at the opposite end of the casing and means for imparting rapid motion to one set of perforated surfaces in one direction and a slower motion to the same in the reverse direction.

3. An extraction column comprising a vertical casing, means for delivering at one end of the casing the material to be treated, means for delivering the extracting medium at the opposite end of the casing, inclined, perforated surfaces fixed in the casing at a suitable distance above each other, a shaft extending axially in the casing, roof shaped perforated surfaces mounted on said shaft in the spaces between the surfaces carried by the casing and inclined in the contrary direction to said surfaces and a rotating cam adapted to impart an axial reciprocating motion to said shaft.

4. An extraction column comprising a vertical casing, means for delivering, at the top of the casing, the material to be treated and means for delivering the extracting medium at the bottom of the casing, a discharge outlet at the upper part of the casing, inclined perforated surfaces mounted in an angularly adjustable position in the casing substantially below the said discharge outlet, and converging towards the axis of the casing, inclined, perforated surfaces fixed in the casing at suitable distance above each other, a shaft extending axially in the casing, roof shaped perforated surfaces mounted on said shaft in the spaces between the surfaces carried by the casing and inclined in the contrary direction to said surfaces, and means for imparting an axial reciprocating motion to the shaft.

5. An extraction column according to claim 4 and further comprising a vertical comb provided on the ridge of the upper most inclined roof shaped surfaces carried by the shaft.

6. An extraction column according to claim 4 in which the lowest roof shaped device and the lowest inclined surfaces carried by the casing are so arranged that the distance between them is smaller than the distance between anyone of the surfaces carried by the shaft and the surfaces carried by the casing immediately above the latter.

ANDRÉ OLIER.